United States Patent [19]

Meyer

[11] Patent Number: 4,556,577
[45] Date of Patent: Dec. 3, 1985

[54] ADMIXTURE OF POTASSIUM CHLORIDE AND MALTODEXTRIN AS SALT SUBSTITUTE AND METHOD OF PREPARATION

[75] Inventor: David R. Meyer, Chesterfield, Mo.

[73] Assignee: Mallinckrodt, Inc., St. Louis, Mo.

[21] Appl. No.: 509,845

[22] Filed: Jun. 30, 1983

[51] Int. Cl.$^4$ ............................................. A23L 1/237
[52] U.S. Cl. ...................................... 426/649; 426/804
[58] Field of Search ................................ 426/649, 804

[56] References Cited

U.S. PATENT DOCUMENTS

| | | | |
|---|---|---|---|
| Re. 27,981 | 4/1974 | Frank et al. | 99/143 |
| 1,978,040 | 4/1933 | Daitz | 99/143 |
| 1,998,179 | 4/1935 | Wolf | 99/11 |
| 2,471,144 | 5/1949 | Davy | 426/649 |
| 2,596,333 | 5/1952 | Halpern | 426/649 |
| 2,742,366 | 4/1956 | Power | 99/143 |
| 3,505,082 | 4/1970 | Miller | 99/143 |
| 3,560,343 | 2/1971 | Armbruster et al. | 195/31 |
| 3,663,369 | 5/1972 | Morehouse et al. | 195/31 |
| 3,773,526 | 11/1973 | Bliznak | 426/215 |
| 3,821,436 | 6/1974 | Fry | 426/213 |
| 3,849,194 | 11/1974 | Armbruster et al. | 127/29 |
| 3,860,732 | 1/1975 | Eisenstadt | 426/219 |
| 3,860,735 | 1/1975 | Eisenstadt | 426/649 |
| 4,013,775 | 3/1977 | Nelson et al. | 426/285 |
| 4,068,006 | 1/1978 | Moritz | 426/99 |
| 4,107,346 | 8/1978 | Kravitz | 426/648 |
| 4,176,201 | 11/1979 | Cook | 426/548 |
| 4,298,400 | 11/1981 | Armbruster | 127/29 |
| 4,340,614 | 7/1982 | Pich et al. | 426/649 |

FOREIGN PATENT DOCUMENTS

| | | |
|---|---|---|
| 838060 | 3/1970 | Canada . |
| 1469089 | 3/1977 | United Kingdom . |
| 2080664 | 2/1982 | United Kingdom . |

OTHER PUBLICATIONS

"Maltrin ® Maltodextrins . . . Carbohydrate Profile", Grain Processing Corporation, Bulletin 9102, 9/82, 4 pages.
"Maltrin Maltodextrins & Corn Syrup Solids", Grain Processing Corporation, Bulletin 11011, 11/81, 7 pages.
"Maltrin M100 Maltodextrin", Grain Processing Corporation, Product Data Sheet 6011, 6/81, one page.

*Primary Examiner*—Raymond Jones
*Assistant Examiner*—Elizabeth A. King
*Attorney, Agent, or Firm*—Richard G. Jackson; Roy J. Klostermann; Lynden N. Goodwin

[57] ABSTRACT

A salt substitute composition is disclosed which includes a blend consisting essentially of:
(a) potassium chloride and
(b) maltodextrin.

15 Claims, No Drawings

ADMIXTURE OF POTASSIUM CHLORIDE AND MALTODEXTRIN AS SALT SUBSTITUTE AND METHOD OF PREPARATION

The present invention relates to a blend composition useful as a substitute for salt.

There are a number of salt substitute compositions which are described in the literature and/or are available commercially containing potassium chloride with and without sodium chloride. Such compositions have been proposed for people who seek to eliminate or minimize the amount of sodium chloride in their diet due to medical necessity or for other reasons. However, the heretofore known salt substitutes have not been entirely satisfactory from the standpoints of similarity to common salt (i.e. sodium chloride) in taste and appearance. Accordingly, there is a substantial need in the art for an improved salt substitute composition.

In U.S. patent application of Alexis D. Bell, Ser. No. 509,844, filed concurrently herewith (June 30, 1983) and assigned to the assignee hereof, there is described a salt substitute composition which comprises coated particles, each particle comprising:
(a) a core comprising potassium chloride and
(b) a coating on the core, the coating comprising a mixture containing
  (i) maltodextrin and
  (ii) sodium chloride,
wherein the dextrose equivalent (D.E.) of the combined amount of potassium chloride, maltodextrin and sodium chloride is not more than 10 D.E. units.

It has now been found unexpectedly that an effective salt substitute can be prepared in simple and efficient manner by admixing potassium chloride and maltodextrin. Admixtures resulting from such admixing have unexpectedly been found to be effective salt-substitute compositions which at least closely approach the taste and appearance of salt and substantially fulfill the above-mentioned need.

DESCRIPTION OF THE INVENTION

Generally stated, the present invention provides a salt-substitute blend composition which comprises a uniform admixture consisting essentially of:
(a) potassium chloride and
(b) maltodextrin,
wherein the dextrose equivalent (D.E.) of the combined amount of potassium chloride and maltodextrin is not more than 10 D.E. units.

DETAILED DESCRIPTION OF THE INVENTION AND OF THE MANNER AND PROCESS OF MAKING AND USING IT

As used herein with reference to a material, the terms "dextrose equivalent" and "D.E." mean the total amount of reducing sugars (calculated as dextrose) in the material, which amount is expressed as a percent of the total weight (dry basis) of the material. Such percent is referred to herein as "D.E. units" (Reducing sugars include, e.g., all monosaccharides; maltose; cellobiose; and lactose. Sucrose is a non-reducing sugar.) The D.E. of a material consisting of two or more components can be calculated by multiplying the weight fraction ("w.f.") of each component of the material by the D.E. of such component and adding the resulting products of multiplication. For example, a material consisting of 20% (0.20 w.f.) component A having a D.E. of 10 D.E. units and 80% (0.80 w.f.) component B having a D.E. of zero has a D.E. of 2 ($0.20 \times 10 + 0.80 \times 0$) D.E. units.

The salt substitute of the present invention contains two essential components, as indicated above. In general, these components may be combined in any relative proportions in accordance with the teachings hereof to prepare a broad range of salt substitutes useful for a wide variety of end use applications, e.g., for table salt, inclusion in snack foods (e.g., pretzels, potato chips, corn chips, etc.), cereals, baked goods and other edible compositions such as those which heretofore have included common salt (i.e., sodium chloride) as ingredients thereof. In use, the salt substitutes of the present invention may be substituted in whole or in part for the common salt component of heretofore known edible compositions.

The salt substitute may include the two essential components (set forth above) in the below indicated amounts:
potassium chloride: from about 99 to about 60%,
maltodextrin: from about 1 to about 40%, and
wherein the percentage amounts are by weight based on the combined weight of such components.

As a general preference, the potassium chloride component is included in an amount from about 90 to about 70% and the maltodextrin component is included in an amount from about 10 to about 30%, wherein the percentage amounts are by weight based on the combined weight of such components.

More preferably, the potassium chloride is included in an amount from about 85 to about 80% and the maltodextrin is included in an amount from about 15 to about 20%, such percentages being by weight and on the aforesaid basis (i.e., the combined total weight of these components being 100% by weight).

For human consumption of the salt-substitute compositions, all ingredients employed should be humanly edible, e.g., Food Chemical Codex grade.

Any suitable maltodextrin may be employed as the maltodextrin component. The maltodextrin employed is preferably a water-soluble maltodextrin having at least a major portion (e.g., slightly more than 50%, preferably about 60% or more) of one or more polysaccharides having a D.P. (i.e., degree of polymerization) of at least 10. More preferably, the maltodextrin employed is additionally a starch hydrolyzate of low sweetness having a low dextrose equivalent value of from about 5 to about 20 more preferably about 5 to about 15 D.E. units, high water solubility with substantial freedom from haze and low hygroscopicity. The most preferred maltodextrin employed herein is that commercially available from Grain Processing Corporation (GPC), Muscatine, Iowa, under the designation MALTRIN ® M100 maltodextrin. According to the "Typical Analysis" in the GPC Bulletin 11011 entitled MALTRIN Maltodextrins & Corn Syrup Solids, M100 maltodextrin has a D.E. of about 9-12 D.E. units and a "Carbohydrate Composition, % (db)" as follows: dextrose (1.0), disaccharides (4.0), trisaccharides (6.0) and "tetrasaccharides & higher" (89.0). According to GPC Product Data Sheet 6011 for MALTRIN M100 maltodextrin, the M100 has a "Typical Carbohydrate Profile (dry basis) in % as follows: monosaccharides (1%), disaccharides (4%), trisaccharides (6%), tetrasaccharides (5%) and "pentasaccharides & above" (84%).

According to GPC Bulletin 9102 relating to "Carbohydrate Profile" of MALTRIN maltodextrins and corn syrup solids, M100 maltodextrin has the following "Typical Carbohydrate Profile":

| Saccharides-by Degree of Polymerization | Amount % Average | Amount % Range |
|---|---|---|
| DP1 | 0.5 | 0.3–0.8 |
| DP2 | 2.7 | 2.3–2.9 |
| DP3 | 4.3 | 4.2–5.0 |
| DP4 | 3.7 | 3.3–4.1 |
| DP5 | 3.1 | 2.7–3.4 |
| DP6 | 5.0 | 0.7–6.0 |
| DP7 | 7.1 | 6.5–8.3 |
| DP8 | 4.5 | 4.2–5.3 |
| DP9 | 3.1 | 2.8–3.6 |
| DP10 | 1.6 | 0.6–2.9 |
| Above DP10 | 64.4 | 56.8–68.1 |

The above GPC bulletins and data sheet are incorporated herein by reference.

Maltodextrins suitable for use herein may be prepared, for example, in accordance with the methods disclosed in U.S. Pat. Nos. 3,560,343; 3,663,369; 3,849,194; and 4,298,400. These patents are incorporated herein by reference.

The salt substitutes may be prepared from raw material ingredients having any suitable particle sizes.

Each component may have a single particle size or may have a particle-size distribution, i.e., a range of particle sizes. The particle size or particle-size distribution of each component is preferably selected such that the resulting admixture of components is homogeneous and substantially free of segregation under storage and handling conditions. For best results, the potassium chloride particles generally have larger weight-average size than the weight-average size of the particles of the maltodextrin component.

As used herein, the term "particle" includes extremely small pieces of matter and small agglomerates or clusters thereof.

For example, good results have been obtained by admixing the following commercially available materials having the indicated typical particle size distribution (in weight percent as a function of mesh size, U.S. Sieve, with a slash symbol (/) meaning "to"):

Potassium Chloride ("Code 6842-Powder", Mallinckrodt, Inc.

| Mesh | +40 | −40/+60 | −60/+70 | −70/+100 | −100 |
|---|---|---|---|---|---|
| Wt. % | 0 | 18 | 16 | 33 | 33 |

Maltodextrin (Maltrin ® M100, Grain Processing Corporation)

| Mesh | +40 | −40/+60 | −60/+80 | −80/+100 | −100/+140 | −140/+200 | −200/+325 | −325 |
|---|---|---|---|---|---|---|---|---|
| Wt. % | 0 | 1 | 2 | 4 | 11 | 27 | 34 | 21 |

Inspection of the above typical size-distribution data shows that typically 100% of Code 6842 potassium chloride will pass a 40-mesh screen, while 67% will so pass and be retained on a 100-mesh screen; 100% of Maltrin M100 maltodextrin will pass a 40-mesh screen, 97% will pass an 80-mesh screen, and 77% will pass an 80-mesh screen and be retained on a 325-mesh screen.

The particular size potassium chloride may be selected to meet any particular end use application. For example, where "pretzel grade" salt substitutes (i.e., plus 35 mesh U.S. sieve size) are desired, potassium chloride having a particle size greater than 35 mesh may be advantageously employed as the starting material. Where "shaker grade" (i.e., minus 35 to plus 60 mesh) is desired for the salt substitute, potassium chloride having a particle size from minus 35 to plus 60 mesh may advantageously be employed as the potassium chloride starting material. Where a "popcorn grade" (i.e., minus 60 mesh) size salt substitute is desired, the potassium chloride starting material may advantageously have a particle size of minus 60 mesh. The description set forth above regarding relative sizes of the components (i.e., potassium chloride particles having larger weight-average size) is applicable to such grades.

The salt substitutes of the present invention are preferably formulated as admixtures of very finely divided particles for use as all or part of the salt-flavor-producing component of such snack foods as potato chips, corn chips, popcorn and others which commonly employ salt powder as such component. As a general preference, all particles included in such admixtures will pass a U.S. Sieve 40-mesh screen and the potassium chloride particles will have larger weight-average size as set forth above.

The salt substitutes of the present invention are preferably prepared by thoroughly admixing the components as substantially dry solids to form a uniform admixture.

The as-produced salt substitutes may be used as is (with or without size classification) or, if desired, may be subjected to size reduction (e.g., crushing) prior to use.

Practice of the present invention is illustrated by the following nonlimiting examples. All parts and percentages given throughout this disclosure including the examples and claims appended hereto, are by weight unless otherwise indicated.

Unless otherwise indicated, the taste panel results set forth in the examples resulted from the following taste test procedure. Each panelist touched his tongue sequentially to each taste sample, which was supported on a clean paper napkin, made his taste evaluation, and rinsed his mouth with water prior to so tasting each sample. Each panel included at least three panelists. The evaluation or rating system is set forth herein below.

EXAMPLES 1–5

Maltodextrin M100 (Grain Processing Corporation), in five separate amounts from about 7 to about 37 parts ("MD") and potassium chloride (Code 6842—powder, Mallinckrodt, Inc.), in five separate corresponding amounts from about 93 to about 63 parts, were thoroughly admixed as substantially dry solids at about 20°–25° C., thereby providing five particulate admixtures each of which was substantially uniform throughout. Typical particle-size distributions of these commercially available materials are set forth above.

Based on method of preparation, each admixture contained the approximate amounts of potassium chloride (KCl) and maltodextrin ("MD") set forth therefor in Table I under the heading "(I) Invention."

Visual observation (without magnification) of each admixture showed that it was substantially identical in appearance to sodium chloride of like size. Each admixture was found to be substantially free-flowing and substantially nonhygroscopic. Samples of each admixture composition were subjected to a taste test for evaluation thereof as a salt substitute. Samples of comparative materials were included in the test. Results of the test are set forth in Table I.

TABLE I

TASTE PANEL RESULTS

| Source of Taste Sample | | | Taste Characteristics[a] | | | | |
|---|---|---|---|---|---|---|---|
| | | | Salti-ness | Bitter-Metallic | Cool-ing | After-taste | Sweet-ness |
| (I) Invention | | | | | | | |
| Ex. | % KCl | % MD | | | | | |
| 1 | 93 | 7 | 1.17 | 2.5 | 1.67 | 1.33 | 0.33 |
| 2 | 85 | 15 | 1.0 | 2.0 | 0.58 | 0.75 | 0.33 |
| 3 | 80 | 20 | 1.17 | 1.17 | 0.33 | 0.58 | 0.33 |
| 4 | 75 | 25 | 1.25 | 0.58 | 0.42 | 0.67 | 0.67 |
| 5 | 63 | 37 | 2.33 | 0.58 | 0.5 | 0.63 | 1.0 |
| (II) Comparative Materials | | | | | | | |
| Sodium Chloride[b] | | | 0.83 | 0 | 0 | 0.67 | 0 |
| Potassium Chloride[c] | | | 0.83 | 3.17 | 2.83 | 2.58 | 0 |
| Cumberland Nu Salt[d] | | | 1.33 | 2.17 | 1.83 | 2.08 | 1.08 |

[a] Each numerical result for each characteristic is the arithmetic average of each panelist's numerical rating made in accordance with the rating system set forth in Table II.
[b] "Popcorn Salt", Diamond Crystal Salt Co.
[c] "6842 - Powder", Mallinckrodt, Inc., St. Louis, Missouri.
[d] "Sweet 'N Low Nu-Salt" Cumberland Packing Corp., Brooklyn, NY) Approximate Analysis: 84% KCl, 15% dextrose, 0.08% "CT" (cream of tartar), 0.7% insoluble matter, 1.5% water. Represented as containing less than 10 mg of sodium per 100 g.

TABLE II

RATING SYSTEM

| Meaning of Numerical Rating | Related Taste Characteristic | |
|---|---|---|
| | Saltiness | All others |
| 0 | Saltier than salt | None |
| 1 | High salt-like taste | Low |
| 2 | Medium salt-like taste | Medium |
| 3 | Low salt-like taste | High |
| 4 | No salt-like taste | Overwhelming |

As shown by the taste panel results in Table I, each of the salt substitute admixtures of the present invention illustrated by Examples 1–5 has been found to closely approach the taste of common salt (sodium chloride) and more closely approach such taste than each of the other comparative materials set forth therein in at least one taste characteristic.

The salt-substitute composition set forth in Example 3 above is contemplated to be the best embodiment of the composition of this invention.

It is contemplated that carrying out production of large-scale (e.g., commercial-size) quantities of the salt substitute of the present invention can best be effected by admixing the components in a ribbon blender.

BEST MODE CONTEMPLATED

The best mode contemplated for carrying out this invention has been set forth in the above description, for example, by way of setting forth preferred materials and operating conditions, including but not limited to preferred ranges and values of amounts and other non-obvious variables material to successfully practicing the invention in the best way contemplated at the time of executing this patent application.

It is understood that the foregoing detailed description is given merely by way of illustration and that many modifications may be made therein without departing from the spirit or scope of the present invention.

What is claimed is:

1. A salt substitute composition which comprises a uniform admixture consisting essentially of, as particulate components thereof:
   (a) potassium chloride and
   (b) maltodextrin, wherein said components are present in the percentage amounts set forth:

potassium chloride: from about 99 to about 60%, and maltodextrin: from about 1 to about 40%, wherein the percentage amounts are by weight based on the combined weight of said components and the dextrose equivalent (D.E.) value of the combined amount of potassium chloride and maltodextrin is not more than 10 D.E. units.

2. The composition of claim 1 wherein said admixture is homogeneous.

3. The composition of claim 1 wherein the amounts of said components are as set forth:

potassium chloride: from about 90 to about 70% and maltodextrin: from about 10 to about 30%.

4. The composition of claim 3 wherein the amounts of said components are as set forth:

potassium chloride: from about 85 to about 80% and maltodextrin: from about 15 to about 20%.

5. The composition of claim 4 wherein the amount of potassium chloride is about 80% and the amount of maltodextrin is about 20%.

6. The composition of claim 1 wherein the average size of the potassium chloride particles is larger than the average size of the maltodextrin particles.

7. The composition of claim 6 wherein:
   (a) the potassium chloride has a particle-size distribution such that about 100% of the potassium chloride will pass a 40-mesh screen and about 67% will be retained on a 100-mesh screen; and
   (b) the maltodextrin has a particle-size distribution such that about 100% of the maltodextrin will pass a 40-mesh screen, about 97% will pass an 80-mesh screen and about 77% will pass an 80-mesh screen and be retained on a 325-mesh screen.

8. The composition of claim 1 wherein said maltodextrin is a water-soluble maltodextrin including as at least a major portion thereof one or more polysaccharides having a degree of polymerization (D.P.) of at least 10.

9. The composition of claim 8 wherein said maltodextrin is a starch hydrolyzate having a low dextrose equivalent (D.E.) value of from about 5 to about 20 D.E. units.

10. The composition of claim 9 wherein said maltodextrin has a D.E. in the range from about 5 to about 15 D.E. units.

11. The composition of claim 10 wherein said range is from about 9 to about 12.

12. The composition of claim 11 wherein said maltodextrin has the following saccharide content as determined by high performance liquid chromatography:

| Saccharides - by Degree of Polymerization | Amount | |
|---|---|---|
| | From About (%) | To About (%) |
| DP1 | 0.3 | 0.8 |

-continued

| Saccharides - by Degree of Polymerization | Amount | |
| --- | --- | --- |
| | From About (%) | To About (%) |
| DP2 | 2.3 | 2.9 |
| DP3 | 4.2 | 5.0 |
| DP4 | 3.3 | 4.1 |
| DP5 | 2.7 | 3.4 |
| DP6 | 0.7 | 6.0 |
| DP7 | 6.5 | 8.3 |
| DP8 | 4.2 | 5.3 |
| DP9 | 2.8 | 3.6 |
| DP10 | 0.6 | 2.9 |
| DP (higher than 10) | 57 | 68 |

13. The composition of claim 12 wherein said saccharide content is as follows:

| Saccharides - by Degree of Polymerization | Amount (%) |
| --- | --- |
| DP1 | about 0.5 |
| DP2 | about 2.7 |
| DP3 | about 4.3 |
| DP4 | about 3.7 |
| DP5 | about 3.1 |
| DP6 | about 5.0 |
| DP7 | about 7.1 |
| DP8 | about 4.5 |
| DP9 | about 3.1 |
| DP10 | about 1.6 |
| DP (higher than 10) | about 64 |

14. The composition of claim 1 wherein said maltodextrin has a dextrose equivalent (D.E.) value of from about 5 to about 20 D.E. units.

15. A process for preparing a salt substitute composition, said process comprising uniformly admixing potassium chloride and maltodextrin, the admixed amounts being such that the dextrose equivalent (D.E.) value of the combined amount of potassium chloride and maltodextrin is not more than 10 D.E. units and, based on said combined amount, the admixed amount of potassium chloride is from about 99 to about 60% and the admixed amount of maltodextrin is from about 1 to about 40%, wherein each amount is by weight.

* * * * *